United States Patent
Nakanishi et al.

(10) Patent No.: US 8,105,718 B2
(45) Date of Patent: Jan. 31, 2012

(54) NON-AQUEOUS ELECTROLYTE SECONDARY BATTERY, NEGATIVE ELECTRODE MATERIAL, AND MAKING METHOD

(75) Inventors: Tetsuo Nakanishi, Annaka (JP); Koichiro Watanabe, Annaka (JP); Hirofumi Fukuoka, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 193 days.

(21) Appl. No.: 12/404,710

(22) Filed: Mar. 16, 2009

(65) Prior Publication Data
US 2009/0239151 A1    Sep. 24, 2009

(30) Foreign Application Priority Data
Mar. 17, 2008 (JP) ................................. 2008-067073
Apr. 21, 2008 (JP) ................................. 2008-109769

(51) Int. Cl.
*H01M 4/13* (2010.01)
*B05D 5/12* (2006.01)

(52) U.S. Cl. .................. 429/231.95; 429/232; 429/212; 429/128; 427/78

(58) Field of Classification Search .................. 429/129, 429/224, 231.1
See application file for complete search history.

(56) References Cited

U.S. PATENT DOCUMENTS

| | | | |
|---|---|---|---|
| 5,401,599 A | 3/1995 | Tahara et al. | |
| 5,478,671 A | 12/1995 | Idota | |
| 6,066,414 A | 5/2000 | Imoto et al. | |
| 6,383,686 B1 | 5/2002 | Umeno et al. | |
| 6,413,672 B1 | 7/2002 | Suzuki et al. | |
| 6,541,377 B2 | 4/2003 | Kim et al. | |
| 6,638,662 B2 | 10/2003 | Kaneda et al. | |
| 6,821,495 B2 * | 11/2004 | Fukuoka et al. | 423/325 |
| 2003/0148185 A1 * | 8/2003 | Kusumoto et al. | 429/233 |
| 2004/0106040 A1 * | 6/2004 | Fukuoka et al. | 429/212 |
| 2006/0166098 A1 | 7/2006 | Tabuchi et al. | |
| 2006/0275662 A1 | 12/2006 | Hirose et al. | |
| 2007/0082266 A1 * | 4/2007 | Waki et al. | 429/224 |
| 2007/0099081 A1 | 5/2007 | Matsuda et al. | |
| 2007/0224508 A1 | 9/2007 | Aramata et al. | |
| 2007/0254102 A1 | 11/2007 | Fukuoka et al. | |

(Continued)

FOREIGN PATENT DOCUMENTS
EP    0143302 A2    6/1985

(Continued)

OTHER PUBLICATIONS

Complete Series of Inorganic Chemistry, vol. XII-2, Silicon (Maruzen Co., Ltd.), pp. 183-185.

(Continued)

*Primary Examiner* — Melvin Mayes
*Assistant Examiner* — Bijay Saha
(74) *Attorney, Agent, or Firm* — Birch, Stewart, Kolasch & Birch, LLP

(57) ABSTRACT

A negative electrode material comprising an active material and 1-20 wt % of a polyimide resin binder is suitable for use in non-aqueous electrolyte secondary batteries. The active material comprises silicon oxide particles and 1-50 wt % of silicon particles. The negative electrode exhibits improved cycle performance while maintaining the high battery capacity and low volume expansion of silicon oxide. The non-aqueous electrolyte secondary battery has a high initial efficiency and maintains improved performance and efficiency over repeated charge/discharge cycles by virtue of mitigated volumetric changes during charge/discharge cycles.

16 Claims, 8 Drawing Sheets

U.S. PATENT DOCUMENTS

| | | |
|---|---|---|
| 2008/0057385 A1* | 3/2008 | Aramata et al. ............. 429/129 |
| 2008/0124631 A1 | 5/2008 | Fukui et al. |
| 2009/0305129 A1 | 12/2009 | Fukui et al. |

FOREIGN PATENT DOCUMENTS

| | | | |
|---|---|---|---|
| EP | 1363341 A2 | 11/2003 |
| JP | 06092617 | * | 4/1994 |
| JP | 06127920 | * | 5/1994 |
| JP | 6-191818 A | 7/1994 |
| JP | 11-086847 A | 3/1999 |
| JP | 2964732 B2 | 10/1999 |
| JP | 2997741 B2 | 1/2000 |
| JP | 3008228 B2 | 2/2000 |
| JP | 2000-173596 A | 6/2000 |
| JP | 2000-215887 A | 8/2000 |
| JP | 3079343 B2 | 8/2000 |
| JP | 2000-243396 A | 9/2000 |
| JP | 3242751 B2 | 12/2001 |
| JP | 2002-042806 A | 2/2002 |
| JP | 2002-075351 A | 3/2002 |
| JP | 3291260 B2 | 6/2002 |
| JP | 2002-220219 A | 8/2002 |
| JP | 2003-109590 A | 4/2003 |
| JP | 2004047404 | 2/2004 |
| JP | 2004-139886 A | 5/2004 |
| JP | 2004-185991 A | 7/2004 |
| JP | 2004-303593 A | 10/2004 |
| JP | 3622629 B2 | 2/2005 |
| JP | 3622631 B2 | 2/2005 |
| JP | 2005-190902 A | 7/2005 |
| JP | 2005-235589 A | 9/2005 |
| JP | 2005243431 | 9/2005 |
| JP | 2005-317309 A | 11/2005 |
| JP | 2006-216374 A | 8/2006 |
| JP | 2006-236684 A | 9/2006 |
| JP | 3846661 B2 | 11/2006 |
| JP | 2006-338996 A | 12/2006 |
| JP | 2006-339092 A | 12/2006 |
| JP | 2007-122992 A | 5/2007 |
| JP | 3918311 B2 | 5/2007 |
| JP | 3982230 B2 | 9/2007 |
| JP | 2007-290919 A | 11/2007 |
| JP | 2008-34352 A | 2/2008 |
| WO | WO-2007/114168 A1 | 10/2007 |

OTHER PUBLICATIONS

Office Action dated Jul. 21, 2010 for Japanese Application No. 2008-067073.

* cited by examiner

1μm

200nm

1μm

1μm

NON-AQUEOUS ELECTROLYTE SECONDARY BATTERY, NEGATIVE ELECTRODE MATERIAL, AND MAKING METHOD

CROSS-REFERENCE TO RELATED APPLICATION

This non-provisional application claims priority under 35 U.S.C. §119(a) on Patent Application Nos. 2008-067073 and 2008-109769 filed in Japan on Mar. 17, 2008 and Apr. 21, 2008, respectively, the entire contents of which are hereby incorporated by reference.

TECHNICAL FIELD

This invention generally relates to non-aqueous electrolyte secondary batteries, typically lithium ion secondary batteries. Specifically, it relates to negative electrode materials for use in such batteries and more particularly, to negative electrode materials comprising silicon oxide and silicon as an active material, and negative electrodes made thereof.

BACKGROUND ART

In conjunction with the recent rapid advances of portable electronic equipment and communications instruments, non-aqueous electrolyte secondary batteries having a high energy density are strongly demanded from the aspects of cost, size and weight reductions. A number of measures are known in the art for increasing the capacity of such non-aqueous electrolyte secondary batteries. For example, JP 3008228 and JP 3242751 disclose negative electrode materials comprising oxides of B, Ti, V, Mn, Co, Fe, Ni, Cr, Nb, and Mo and composite oxides thereof. A negative electrode material comprising $M_{100-x}Si_x$ wherein $x \geqq 50$ at % and M=Ni, Fe, Co or Mn is obtained by quenching from the melt (JP 3846661). Other negative electrode materials are known as comprising silicon oxide (JP 2997741), and $Si_2N_2O$, $Ge_2N_2O$ or $Sn_2N_2O$ (JP 3918311).

Silicon is regarded most promising in attaining the battery's goals of size reduction and capacity enhancement since it exhibits an extraordinarily high theoretical capacity of 4,200 mAh/g as compared with the theoretical capacity 372 mAh/g of carbonaceous materials that are currently used in commercial batteries. Silicon is known to take various forms of different crystalline structure depending on their preparation. For example, JP 2964732 discloses a lithium ion secondary battery using single crystal silicon as a support for negative electrode active material. JP 3079343 discloses a lithium ion secondary battery using a lithium alloy $Li_xSi$ ($0 \leqq x \leqq 5$) with single crystal silicon, polycrystalline silicon or amorphous silicon. Of these, the lithium alloy $Li_xSi$ with amorphous silicon is preferred, which is prepared by coating crystalline silicon with amorphous silicon resulting from plasma decomposition of monosilane, followed by grinding. However, the negative electrode material therein uses 30 parts of a silicon component and 55 parts of graphite as the conductive agent as described in Example, failing to take full advantage of the potential battery capacity of silicon.

For the purpose of imparting conductivity to negative electrode materials, JP-A 2000-243396 teaches mechanical alloying of a metal oxide such as silicon oxide with graphite and subsequent carbonization; JP-A 2000-215887 mentions coating of Si particles on their surface with a carbon layer by chemical vapor deposition; and JP-A 2002-42806 proposes coating of silicon oxide particles on their surface with a carbon layer by chemical vapor deposition. The provision of particle surfaces with a carbon layer improves conductivity, but is not successful in overcoming the outstanding problems of silicon negative electrodes, i.e., in mitigating substantial volumetric changes associated with charge/discharge cycles or in preventing electricity collection and cycle performance from degrading.

Recently different approaches are thus taken, for example, a method for restraining volume expansion by restricting the percent utilization of silicon battery capacity (JP-A 2000-215887, JP-A 2000-173596, JP 3291260, JP-A 2005-317309), a method of quenching a melt of silicon having alumina added thereto for utilizing grain boundaries in polycrystalline particles as the buffer to volumetric changes (JP-A 2003-109590), polycrystalline particles of mixed phase polycrystals of α- and β-$FeSi_2$ (JP-A 2004-185991), and hot plastic working of a monocrystalline silicon ingot (JP-A 2004-303593).

Means for mitigating volume expansion by tailoring the layer structure of silicon active material are also disclosed, for example, disposition of two layers of silicon negative electrode (JP-A 2005-190902), and coating or encapsulating with carbon or another metal and oxide for restraining particles from spalling off (JP-A 2005-235589, JP-A 2006-216374, JP-A 2006-236684, JP-A 2006-339092, JP 3622629, JP-A 2002-75351, and JP 3622631). In the method of gas phase growing silicon directly on a current collector, degradation of cycle performance due to volume expansion can be restrained by controlling the growth direction (JP-A 2006-338996).

The method of enhancing the cycle performance of negative electrode material by coating silicon surfaces with carbon to be electrically conductive or coating silicon with an amorphous metal layer as mentioned above utilizes only about a half of the silicon's own battery capacity. There is a desire for a higher capacity. As for the polycrystalline silicon having grain boundaries, the disclosed method is difficult to control the cooling rate and hence, to reproduce consistent physical properties.

On the other hand, silicon oxide is represented by $SiO_x$ wherein x is slightly greater than the theory of 1 due to oxide coating, and is found on X-ray diffractometry analysis to have the structure that amorphous silicon ranging from several to several tens of nanometers is finely dispersed in silica. The battery capacity of silicon oxide is smaller than that of silicon, but greater than that of carbon by a factor of 5 to 6 on a weight basis. Silicon oxide experiences a relatively less volume expansion. Silicon oxide is thus believed ready for use as the negative electrode active material. Nevertheless, silicon oxide has a substantial irreversible capacity and a very low initial efficiency of about 70%, which requires an extra battery capacity of the positive electrode when a battery is actually fabricated. Then an increase of battery capacity corresponding to the 5 to 6-fold capacity increase per active material weight is not expectable.

The problem of silicon oxide to be overcome prior to practical use is a substantially low initial efficiency. This may be overcome by making up the irreversible fraction of capacity or by restraining the irreversible capacity. The method of making up the irreversible fraction of capacity by previously doping silicon oxide with Li metal is reported effective. Doping of lithium metal may be carried out by attaching a lithium foil to a surface of negative electrode active material (JP-A 11-086847) or by vapor depositing lithium on a surface of negative electrode active material (JP-A 2007-122992). As for the attachment of a lithium foil, a thin lithium foil that matches with the initial efficiency of silicon oxide negative electrode is hardly available or prohibitively expensive if available. The deposition of lithium vapor makes the fabrication process complex and is impractical.

Aside from lithium doping, it is also disclosed to enhance the initial efficiency of negative electrode by increasing a weight proportion of silicon. One method is by adding silicon particles to silicon oxide particles to reduce the weight proportion of silicon oxide (JP 3982230). In another method, silicon vapor is generated and precipitated in the same stage as is produced silicon oxide, obtaining mixed solids of silicon and silicon oxide (JP-A 2007-290919). Silicon has both a high initial efficiency and a high battery capacity as compared with silicon oxide, but displays a percent volume expansion as high as 400% upon charging. Even when silicon is added to a mixture of silicon oxide and carbonaceous material, the percent volume expansion of silicon oxide is not maintained, and eventually at least 20 wt % of carbonaceous material must be added in order to suppress the battery capacity at 1,000 mAh/g. The method of obtaining the mixed solids by simultaneously generating silicon and silicon oxide vapors suffers from the working problem that the low vapor pressure of silicon necessitates the process at a high temperature in excess of 2,000° C.

As discussed above, the silicon-based active material still has a problem to be solved prior to practical use, independent of whether it is based on a metal element or an oxide thereof. There is a desire to have a negative electrode active material which can restrain the volumetric change associated with occlusion and release of lithium, mitigate a lowering of conductivity due to atomization by fissure of particles and separation of particles from the current collector, be manufactured on a mass scale at a low cost, and comply with the application as in mobile phones where repetitive cycle performance is of high priority.

CITATION LIST

Patent Document 1: JP 3008228
Patent Document 2: JP 3242751
Patent Document 3: JP 3846661
Patent Document 4: JP 2997741
Patent Document 5: JP 3918311
Patent Document 6: JP 2964732
Patent Document 7: JP 3079343
Patent Document 8: JP-A 2000-243396
Patent Document 9: JP-A 2000-215887
Patent Document 10: JP-A 2002-42806
Patent Document 11: JP-A 2000-173596
Patent Document 12: JP 3291260
Patent Document 13: JP-A 2005-317309
Patent Document 14: JP-A 2003-109590
Patent Document 15: JP-A 2004-185991
Patent Document 16: JP-A 2004-303593
Patent Document 17: JP-A 2005-190902
Patent Document 18: JP-A 2005-235589
Patent Document 19: JP-A 2006-216374
Patent Document 20: JP-A 2006-236684
Patent Document 21: JP-A 2006-339092
Patent Document 22: JP 3622629
Patent Document 23: JP-A 2002-75351
Patent Document 24: JP 3622631
Patent Document 25: JP-A 2006-338996
Patent Document 26: JP-A 11-086847
Patent Document 27: JP-A 2007-122992
Patent Document 28: JP 3982230
Patent Document 29: JP-A 2007-290919

SUMMARY OF INVENTION

An object of the invention is to provide a negative electrode material for non-aqueous electrolyte secondary batteries comprising silicon oxide particles as an active material, which exhibits a high 1st cycle charge/discharge efficiency and improved cycle performance while maintaining the high battery capacity and low volume expansion of silicon oxide. Another object is to provide a negative electrode made of this material and a non-aqueous electrolyte secondary battery using the same.

The inventors made efforts to search for a negative electrode active material which has a high battery capacity surpassing carbonaceous materials, minimizes a change of volume expansion inherent to silicon, overcomes silicon oxide's drawback of a low 1st cycle charge/discharge efficiency, and has a high initial charge/discharge efficiency.

As a result, the inventors have found that the problem is overcome by using both silicon oxide particles and polycrystalline silicon particles as the active material. When polycrystalline silicon is added to silicon oxide, a volume expansion in excess of 400% as often found with ordinary silicon is not observed, and a percent volume expansion is maintained at a level approximately equal to that of silicon oxide. This leads to an increased battery capacity per volume. The conductivity can be improved by addition or coating of a conductive agent. The conductivity is also improved by vapor deposition of carbon. A polyimide resin is used as a binder to prevent the negative electrode material from being broken or powdered by repetition of expansion and contraction on charge/discharge cycles. Then the electrode itself does not experience a loss of conductivity. Using this negative electrode material, a non-aqueous electrolyte secondary battery having improved cycle performance is fabricated. The invention is predicated on this finding.

The inventors have also found that the outstanding problems can be overcome by using both specific coated silicon oxide particles having a graphite coating and 1 to 50 wt % of silicon particles as the active material. When silicon is added to graphite-coated silicon oxide particles, a volume expansion in excess of 400% as often found with ordinary silicon is not observed, and a percent volume expansion is maintained at a level approximately equal to that of silicon oxide. This leads to an increased battery capacity per volume. The conductivity can be improved by addition or coating of a conductive agent. The conductivity and initial charge/discharge efficiency are improved by coating of graphite, and 1 to 20 wt % of a binder is compounded in the negative electrode material to prevent it from being broken or powdered by repetition of expansion and contraction on charge/discharge cycles, then the electrode itself does not experience a loss of conductivity. Using this negative electrode material, a non-aqueous electrolyte secondary battery having improved cycle performance is fabricated. The invention is predicated on this finding.

Accordingly, the invention provides a negative electrode material, a method for the preparation thereof, a negative electrode, and a non-aqueous electrolyte secondary battery, defined below.

[1] A negative electrode material for non-aqueous electrolyte secondary batteries, comprising an active material and 1 to 20% by weight of a binder, wherein said active material comprises silicon oxide particles and silicon particles, and the silicon particles are present in an amount of not more than 50% by weight based on the active material.

[2] The negative electrode material of [1] wherein said silicon particles are polycrystalline silicon particles.

[3] The negative electrode material of [2] wherein said silicon oxide particles and/or said polycrystalline silicon particles are coated with carbon.

[4] The negative electrode material of [2] or [3] wherein said polycrystalline silicon particles have a crystallite size of 20 nm to 34 nm as determined, on X-ray diffraction analysis, by the Scherrer equation from the FWHM (full width at half maximum) of a diffraction curve assigned to Si(111) around $2\theta=28.4°$.

[5] The negative electrode material of any one of [2] to [4] wherein said polycrystalline silicon particles have a true specific gravity of 2.300 to 2.320.

[6] The negative electrode material of any one of [2] to [5] wherein said polycrystalline silicon particles have been prepared by pyrolysis of a silane gas at a temperature of up to 1,000° C.

[7] The negative electrode material of [6] wherein said polycrystalline silicon particles are particulate polycrystalline silicon which has been prepared by pyrolysis of a silane gas in a fluidized bed.

[8] The negative electrode material of [6] or [7] wherein the silane gas is a silane or chlorosilane.

[9] The negative electrode material of any one of [2] to [8] wherein said polycrystalline silicon particles have a median diameter $D_{50}$ of 0.1 to 20 µm.

[10] The negative electrode material of [1] wherein said silicon oxide particles are silicon oxide particles coated on their surface with a graphite coating, said graphite coating, on Raman spectroscopy, exhibits scattering peaks having an intensity $I_{1330}$ and $I_{1580}$ at 1330 cm$^{-1}$ and 1580 cm$^{-1}$, an intensity ratio $I_{1330}/I_{1580}$ being in the range: $1.5<I_{1330}/I_{1580}<3.0$, and the coated silicon oxide particles, on solid NMR ($^{29}$Si-DDMAS) analysis, exhibit a signal area $S_{-84}$ around $-84$ ppm and a broad signal area $S_{-110}$ centering around $-110$ ppm, an area ratio $S_{-84}/S_{-110}$ being in the range: $0.5<S_{-84}/S_{-110}<1.1$.

[11] The negative electrode material of [10] wherein said silicon oxide particles have been prepared by heating a mixture of silicon dioxide and metallic silicon under vacuum at a temperature of 1,000 to 1,500° C. to produce a silicon oxide gas and letting the silicon oxide gas to precipitate at a temperature of 500 to 1,100° C.

[12] The negative electrode material of [10] or [11] wherein said silicon particles are polycrystalline silicon particles.

[13] The negative electrode material of [10], [11] or [12] wherein said silicon particles are silicon particles coated on their surface with a graphite coating.

[14] The negative electrode material of any one of [1] to [13] wherein said binder comprises a polyimide resin.

[15] A negative electrode for non-aqueous electrolyte secondary batteries, comprising the negative electrode material of any one of [1] to [14] and experiencing a volumetric change by a factor of less than 2 before and after charging.

[16] A non-aqueous electrolyte secondary battery comprising a negative electrode of [15], a positive electrode, a separator, and a non-aqueous electrolyte.

[17] The non-aqueous electrolyte secondary battery of [16] which is a lithium ion secondary battery.

[18] A method for preparing the negative electrode material of [10], comprising the steps of (I) effecting chemical vapor deposition of an organic gas and/or vapor on silicon oxide particles under a vacuum of 50 to 30,000 Pa at 600 to 1,100° C. to coat surfaces of the silicon oxide particles with a graphite coating, and (II) combining the coated silicon oxide particles resulting from step (I) with silicon particles and a binder.

[19] The method of [18] wherein throughout the steps, the silicon oxide particles and the coated silicon oxide particles are kept in an atmosphere which is up to 1,100° C.

ADVANTAGEOUS EFFECTS OF INVENTION

Having solved the outstanding serious problem of a low 1st cycle charge/discharge efficiency of silicon oxide, the negative electrode for non-aqueous electrolyte secondary batteries according to the invention exhibits improved cycle performance and maintains the high battery capacity and low volume expansion of silicon oxide. The negative electrode material comprising silicon oxide and silicon as the active material and a polyimide resin as the binder is fully adherent to a current collector. The non-aqueous electrolyte secondary battery has a high initial efficiency and maintains improved performance and efficiency over repeated charge/discharge cycles by virtue of mitigated volumetric changes during charge/discharge cycles.

DESCRIPTION OF EMBODIMENTS

Figure 1:
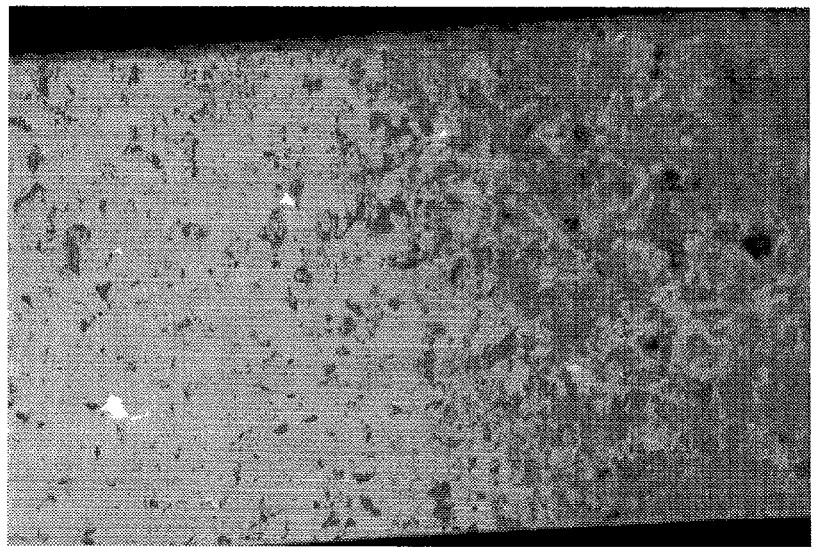
FIG. 1 is a TEM image (×15,000) showing the crystal structure of polycrystalline silicon I-1 according to the invention.

As used herein, the term "conductive" or "conductivity" refers to electrically conductive or electric conductivity.

The negative electrode material for non-aqueous electrolyte secondary batteries according to the invention comprises an active material and a binder. The active material comprises silicon oxide particles and silicon particles. The silicon particles are present in an amount of not more than 50% by weight based on the active material. The binder is present in an amount of 1 to 20% by weight based on the negative electrode material.

Silicon Oxide

As used herein, the term "silicon oxide" generally refers to amorphous silicon oxides which are produced by heating a mixture of silicon dioxide and metallic silicon to produce silicon oxide gas and cooling the gas for precipitation. Silicon oxide is represented by the general formula SiOx wherein x is in the range: $1.0 \leq x < 1.6$. The mixture contains silicon dioxide and metallic silicon in a molar ratio of approximately 1:1. When the mixture is heated under reduced pressure at 1,000 to 1,500° C., preferably 1,100 to 1,500° C., it produces silicon oxide gas. The gas is led into a precipitating chamber at 500 to 1,100° C. where silicon oxide is solidified and collected. Most often, x is in the range: $1.0 \leq x \leq 1.2$.

The silicon oxide thus produced is ground into particles prior to use. For the management of particle size, the particle size distribution may be measured by the laser diffraction scattering method. A powder sample of particles having a total volume of 100% is analyzed to draw a cumulative curve, and the particle size at 10%, 50%, and 90% on the cumulative curve is designated 10% diameter, 50% diameter, and 90% diameter (in μm), respectively. In the invention, evaluation is made on the basis of 50% diameter which is a 50% cumulative diameter or median diameter $D_{50}$. The powder should preferably have a median diameter $D_{50}$ of 0.1 μm to 50 μm and more preferably 1 μm to 20 μm. Outside the range, a smaller median diameter corresponds to a larger specific surface area which may lead to a lower negative electrode film density whereas particles with a larger median diameter may penetrate through a negative electrode film, causing short-circuits.

To produce silicon oxide particles of the predetermined size, any well-known grinding machine may be used in combination with a classifier. Use may be made of, for example, a ball mill and media agitating mill in which grinding media such as balls or beads are brought in motion and the charge (to be ground) is ground by utilizing impact forces, friction forces or compression forces generated by the kinetic energy; a roller mill in which grinding is carried out by compression forces generated between rollers; a jet mill in which the charge is impinged against the liner or each other at a high speed, and grinding is carried out by impact forces generated by impingement; a hammer mill, pin mill and disc mill in which a rotor with hammers, blades or pins attached thereto is rotated and the charge is ground by impact forces generated by rotation; a colloid mill utilizing shear forces; and a wet, high pressure, counter-impingement dispersing machine "Ultimizer" (Sugino Machine Ltd.). Either wet or dry grinding may be employed. The grinding may be followed by dry, wet or sieve classification in order to gain a proper particle size distribution. The dry classification generally uses a gas stream and includes successive or simultaneous steps of dispersion, separation (segregation between fine and coarse particles), collection (separation between solid and gas), and discharge. To prevent the classification efficiency from being reduced by the impacts of interference between particles, particle shape, turbulence and velocity distribution of the gas stream, electrostatic charges, or the like, pretreatment (adjustment of water content, dispersibility, humidity or the like) is carried out prior to the classification, or the gas stream is adjusted in moisture content and oxygen concentration prior to use. An integrated type of dry grinder/classifier may also be used which can conduct grinding and classifying operations at a time to deliver an output of the desired particle size distribution.

On the silicon oxide particles which have been ground to the predetermined particle size, carbon may be deposited by chemical vapor deposition (CVD) or mechanical alloying. It is noted that the silicon oxide particles prior to carbon coating are sometimes referred to as "neat particles" to distinguish them from the coated particles.

A hydrocarbon compound gas and/or vapor is introduced under atmospheric pressure or reduced pressure, then a well-known hot CVD treatment is effected at a temperature of 600 to 1,200° C., preferably 800 to 1,100° C., to form a carbon film on particle surfaces, and at the same time, to form a silicon carbide layer at the silicon-carbon layer interface, yielding silicon composite particles. The hydrocarbon compound used herein is selected from those compounds capable of producing carbon (graphite) through pyrolysis at the heat treatment temperature, for example, hydrocarbons such as methane, ethane, propane, butane, pentane, hexane, etc. and ethylene, propylene, butylene, acetylene, etc., alone or in admixture, or alcohols such as methanol and ethanol, mono- to tri-cyclic aromatic hydrocarbons such as benzene, toluene, xylene, styrene, ethylbenzene, diphenylmethane, naphthalene, phenol, cresol, nitrobenzene, chlorobenzene, indene, coumarone, pyridine, anthracene, and phenanthrene, alone or in admixture. Also, gas light oil, creosote oil and anthracene oil obtained from the tar distillation step are useful as well as naphtha cracked tar oil, alone or in admixture.

When silicon oxide particles are coated with carbon, the buildup (or coating weight) of carbon is preferably 1 to 50%, and more preferably 5 to 20% by weight based on the carbon-coated silicon oxide particles.

On solid NMR ($^{29}$Si-DDMAS) analysis, the coated silicon oxide particles exhibits a signal area $S_{-84}$ developing around −84 ppm between −45 ppm and −98 ppm and a broad signal area $S_{-110}$ centering around −110 ppm between −98 ppm and −145 ppm. Herein, an area ratio $S_{-84}/S_{-110}$ is preferably in the range: $0.5 < S_{-84}/S_{-110} < 1.1$, more preferably between 0.6 and 1.0, and even more preferably between 0.6 and 0.8. It is noted that on the NMR spectroscopy, amorphous silicon oxide normally exhibits only a broad peak centering around −110 ppm while a peak characteristic of Si diamond crystals is detected around −84 ppm due to thermal hysteresis. That is, a smaller area centering the signal attributable to Si diamond crystals is preferred.

The coated silicon oxide particles are silicon oxide particles coated on their surface with a graphite coating. It is important to select the type of graphite enclosing surfaces of silicon oxide particles and control the proportion thereof within a certain range. On Raman spectroscopy analysis, the graphite coating exhibits scattering peaks having an intensity $I_{1330}$ and $I_{1580}$ at 1330 cm$^{-1}$ and 1580 cm$^{-1}$. Herein an intensity ratio $I_{1330}/I_{1580}$ is preferably in the range: $1.5 < I_{1330}/I_{1580} < 3.0$. In general, graphitic materials are classified into three allotropies, diamond, graphite, and amorphous carbon. These graphitic materials have their own physical properties. Specifically, diamond has a high strength, high density and high insulation, and graphite has good electrical conductivity. As the graphite material that encloses surfaces of silicon oxide particles, a graphitic material having diamond structure and a graphitic material having graphite structure are mixed in an optimum proportion so as to gain an optimum combination of the respective characteristics, resulting in a negative electrode material capable of preventing failure by expansion and contraction during charge/discharge cycles and having a conductive network.

The proportion of the graphitic material having diamond structure and the graphitic material having graphite structure may be determined by Raman spectroscopy analysis, i.e., on the basis of a Raman spectrum. More specifically, since diamond develops a sharp peak at 1330 cm$^{-1}$ Raman shift and graphite develops a sharp peak at 1580 cm$^{-1}$ Raman shift, the proportion of the two graphitic components may be simply determined from a ratio of peak intensities.

The inventors have found that when silicon oxide having a graphite coating which on Raman spectroscopy analysis, develops a scattering peak having an intensity $I_{1330}$ at 1330 cm$^{-1}$ Raman shift and a scattering peak having an intensity $I_{1580}$ at 1580 cm$^{-1}$ Raman shift, wherein an intensity ratio $I_{1330}/I_{1580}$ is in the range: $1.5 < I_{1330}/I_{1580} < 3.0$, and preferably $1.7 < I_{1330}/I_{1580} < 2.5$ is used as a lithium ion secondary battery negative electrode material, a lithium ion secondary battery having satisfactory battery performance is obtained.

If the proportion of graphite structure material is so high as to provide an intensity ratio $I_{1330}/I_{1580}$ equal to or less than 1.5, the graphite coating may have a reduced strength so that electrode failure may occur due to expansion and contraction of electrode material during charge/discharge cycles, leading to a lowering of battery capacity and degradation of cycle performance on repeated use. If the proportion of diamond structure material is so high as to provide an intensity ratio $I_{1330}/I_{1580}$ equal to or more than 3.0, there may result a loss of conductivity and degradation of cycle performance.

The coated silicon oxide particles (which is coated with graphite having the specific Raman spectroscopy intensity ratio) may be prepared, for example, by subjecting surfaces of silicon oxide particles to CVD in an organic gas and/or vapor under a reduced pressure of 50 to 30,000 Pa at a temperature of 600 to 1,100° C. The reduced pressure is preferably 100 to 20,000 Pa, and more preferably 1,000 to 20,000 Pa. Under a pressure of lower than 50 Pa, there results a graphitic material having a higher proportion of diamond structure, which may lead to losses of conductivity and cycle performance when used as a lithium ion secondary battery negative electrode. Under a pressure of higher than 30,000 Pa, there results a graphitic material having a higher proportion of graphite structure, which may lead to losses of battery capacity and cycle performance when used as a lithium ion secondary battery negative electrode. The CVD temperature is preferably 800 to 1,050° C. A temperature below 600° C. may require a longer time of treatment. If the treatment temperature is above 1,100° C., particles may be fused and agglomerated together during CVD and hence, a conductive coating may not be formed at the agglomerated interface, resulting in a negative electrode material having poor cycle performance. Additionally, disproportionation reaction of silicon oxide may take place, leading to a signal area ratio in excess of 1.1 on solid NMR analysis. The treatment time may be determined as appropriate depending on the graphite buildup, treatment temperature, and the concentration (or flow velocity) and quantity of organic gas. Usually a treatment time of 1 to 10 hours, especially 2 to 7 hours is employed for efficiency and economy. The coated silicon oxide particles thus obtained have the structure having silicon fine-grains dispersed in a silicon oxide.

When silicon oxide particles are coated with graphite so as to meet the intensity and area ratios defined above, the buildup (or coating weight) of graphite is preferably 1 to 50%, and more preferably 5 to 20% by weight based on the coated silicon oxide particles, but not particularly limited thereto. Outside the range, a larger buildup of carbon may detract from the battery capacity characteristic of silicon oxide whereas a smaller buildup may lead to inconsistent carbon coatings and fail to provide a sufficient conductivity.

The organic material to generate the organic gas is selected from those materials capable of producing carbon (graphite) through pyrolysis at the heat treatment temperature, especially in a non-oxidizing atmosphere. Exemplary are hydrocarbons such as methane, ethane, ethylene, acetylene, propane, butane, butene, pentane, isobutane, and hexane alone or in admixture of any, and monocyclic to tricyclic aromatic hydrocarbons such as benzene, toluene, xylene, styrene, ethylbenzene, diphenylmethane, naphthalene, phenol, cresol, nitrobenzene, chlorobenzene, indene, coumarone, pyridine, anthracene, and phenanthrene alone or in admixture of any. Also, gas light oil, creosote oil and anthracene oil obtained from the tar distillation step are useful as well as naphtha cracked tar oil, alone or in admixture.

The coated silicon oxide particles having the specific intensity and area ratios preferably have an average particle size of 0.1 to 50 µm, and more preferably 1 to 20 µm, like the neat silicon oxide particles. Note that the average particle size is determined by measurement of particle size distribution by laser diffraction scattering method, like the neat silicon oxide particles.

In the active material, the coated silicon oxide particles having the specific intensity and area ratios are preferably present in an amount of 50 to 99%, more preferably 70 to 95%, and even more preferably 70 to 90% by weight based on the active material.

Silicon

As is well known in the art, silicon is divided into single crystal silicon, polycrystalline silicon, and amorphous silicon in terms of crystallinity, and into chemical grade silicon (often referred to as metallic silicon) and metallurgical grade silicon in terms of purity. Herein, single crystal silicon and polycrystalline silicon are preferred because of a high purity, with the polycrystalline silicon being more preferred. The polycrystalline silicon consists of partially ordered crystals. On the other hand, the amorphous silicon differs in that it assumes a substantially disordered arrangement of silicon atoms having a network structure, but may be used because amorphous silicon can be transformed into polycrystalline silicon by heat aging. Also, polycrystalline silicon may be prepared by melting metallic silicon and directionally solidifying the melt, for thereby causing segregation of impurities and increasing the purity, or by quenching the metallic silicon melt. These polycrystalline silicon products are advantageously used because they are mostly less expensive than polycrystalline silicon products prepared from monosilane and chlorosilane. Even the chemical grade silicon having a low purity may be used as an inexpensive reactant because impurities such as aluminum, iron and calcium can be dissolved away by acid treatment.

Polycrystalline silicon consists of relatively large crystal grains of different orientation defining boundaries therebetween. As described in Complete Series of Inorganic Chemistry, Vol. XII-2, Silicon (Maruzen Co., Ltd.), p 184, polycrystalline silicon can be synthesized from trichlorosilane or monosilane. The current mainstream processes for producing polycrystalline silicon in an industrial manner are the Siemens process and Komatsu-ASiMI process involving pyrolysis of trichlorosilane or monosilane in a precipitating reactor (or bell jar) and depositing in a silicon rod form. The ethyl process involving using a fluidized bed reactor and growing polycrystalline silicon on surfaces of silicon particles is also available. Polycrystalline silicon may also be prepared by melting metallic silicon and directionally solidifying the melt, for thereby causing segregation of impurities and increasing the purity, or by quenching the silicon melt. It is known that polycrystalline silicon products thus synthesized differ in conductivity and residual strain depending on the size and orientation of crystal grains.

The polycrystalline silicon which is particularly useful herein is one produced through pyrolysis of a silane gas (i.e., silane or chlorosilane) in a relatively low temperature range of up to 1,000° C., and crystal growth. The production processes used herein include the Siemens, Komatsu-ASiMI, and ethyl processes, mentioned above. The Siemens and Komatsu-ASiMI processes are batchwise in that polycrystalline silicon is precipitated on a surface of a silicon rod. Because polycrystalline silicon growing on the rod surface undergoes recrystallization, relatively large crystal grains are likely to form.

On the other hand, the ethyl process using a fluidized bed reactor is characterized by a high productivity, effective gas-solid heat transfer, and a uniform heat distribution within the reactor because polycrystalline silicon is grown on particle surfaces so that a large specific surface area is available for reaction. Since polycrystalline silicon particles growing to a particular particle size corresponding to the linear velocity of the fluidized layer are discharged from within the reactor, continuous reaction is possible. Since the growth of crystallites is slow, relatively small crystal grains are formed.

Examples of the silane or chlorosilane used in the production processes described above include monosilane, disilane, monochlorosilane, dichlorosilane, trichlorosilane and tetrachlorosilane. The growth temperature of polycrystalline silicon on a rod is around 850° C. when monosilane is used and around 1,100° C. when trichlorosilane is used. Preference is given to monosilane and dichlorosilane which can be decomposed at temperatures below 1,000° C. Although the fluidized bed process using monosilane employs a further lower temperature of 600 to 800° C., the process is typically carried out around 650° C. because operation at higher temperatures causes fine particles to form as a result of decomposition and growth in the vapor phase. The use of monosilane or dichlorosilane as reactant gas enables to maintain the reactor at a relatively low temperature, and the use of a fluidized bed reactor as the reaction system enables to reduce the residence time within the fluidized bed and to slow down the crystal growth of polycrystalline silicon being deposited. As a result, fully densified crystal grains are formed, and fine voids are defined between crystal grains being deposited one on another. It is believed that these fine voids function to mitigate the volume expansion and restrain cleavage upon charging.

One effective physical measure for rating crystal grains of polycrystalline silicon is measurement of crystallites by X-ray diffraction. On X-ray diffraction analysis, the diameter of crystallites is determined by the Scherrer equation from the full width at half maximum (FWHM) of a diffraction curve assigned to Si(111) around $2\theta=28.4°$. Crystallites of polycrystalline silicon produced from monosilane, for the most part, have a size of 2-0 to 34 nm, while crystallites produced from trichlorosilane have a size of 35 to 40 nm, with an increase of crystallite size being observed. On the other hand, crystallites of metallic silicon and polycrystalline silicon produced by directional solidification, quenching and hot plastic working processes have a size of 40 to 45 nm, which is undesired for the non-aqueous electrolyte secondary battery application contemplated herein.

The polycrystalline silicon produced in the fluidized bed reactor, for the most part, has a specific gravity of 2.300 to 2.320, which is very low as compared with single crystal silicon, implying a rather amorphous crystal structure. On the other hand, polycrystalline silicon produced from trichlorosilane by the Siemens process, polycrystalline silicon produced from monosilane by the Komatsu-ASiMI process, and metallic silicon have a specific gravity in the range of 2.320 to 2.340, which is substantially equal to single crystal silicon, implying a densified crystal structure within particles.

The polycrystalline silicon produced by the aforementioned process has chemically bonded hydrogen atoms. Its silicon purity can be improved typically by heat treatment at 1,000 to 1,200° C. for a brief time of 2 to 4 hours. The hydrogen content which is normally about 600 to 1,000 ppm prior to the heat treatment may be reduced to or below 30 ppm by the heat treatment. Preferred for use in the negative electrode material is polycrystalline silicon which has been purified to a hydrogen content of up to 30 ppm by heat treatment.

Like the silicon oxide particles described above, silicon particles may be coated with carbon. Deposition of carbon improves conductivity, with improvements in cycle performance and battery capacity being expectable. The buildup (or coating weight) of carbon is preferably 0.1 to 20% and more preferably 1 to 10% by weight of the carbon-coated polycrystalline silicon particles.

The polycrystalline silicon is ground to the desired particle size prior to use. Grinding may be performed as described for the silicon oxide. The silicon powder should preferably have a median diameter $D_{50}$ of 0.1 μm to 50 μm and more preferably 0.1 μm to 10 μm. Too large a particle size may have a tendency to increase volume expansion. The particle size measurement is the same as described for the silicon oxide particles.

According to the invention, silicon oxide particles combined with polycrystalline silicon particles are used as the active material for non-aqueous electrolyte secondary battery negative electrodes. This combination has many advantages including a high capacity as compared with the currently used graphite and carbonaceous materials, a high initial efficiency as compared with silicon oxide alone, controlled volumetric changes associated with charge/discharge cycles as compared with silicon itself, and improved adhesion between particles and the binder. This ensures fabrication of a non-aqueous electrolyte secondary battery, especially lithium ion secondary battery, having improved cycle performance.

In the active material, silicon particles are present in an amount of not more than 50%, preferably 1 to 50%, more preferably 5 to 30%, and even more preferably 10 to 30% by weight. Less than 1 wt % of silicon particles may be too small to exert the effect of improving initial efficiency whereas an active material containing more than 50 wt % of silicon particles may be difficult to maintain a percent volume expansion.

Preferred for use as the active material are the following combinations:
[1] a combination of silicon oxide particles with polycrystalline silicon particles, and
[2] a combination of graphite-coated silicon oxide particles with silicon particles, provided that the graphite coating, on Raman spectroscopy, exhibits scattering peaks having an intensity $I_{1330}$ and $I_{1580}$ at 1330 cm$^{-1}$ and 1580 cm$^{-1}$, in an intensity ratio $I_{1330}/I_{1580}$ in the range: $1.5<I_{1330}/I_{1580}<3.0$, and the coated silicon oxide particles, on solid NMR ($^{29}$Si-DDMAS) analysis, exhibit a signal area $S_{-84}$ around −84 ppm and a broad signal area $S_{-110}$ centering around −110 ppm, in an area ratio $S_{-84}/S_{-110}$, in the range: $0.5<S_{-84}/S_{-110}<1.1$.

The active material is present in an amount of 50 to 98%, more preferably 75 to 96%, and even more preferably 80 to 96% by weight based on the negative electrode material.

Binder

A binder is used in the negative electrode material. The binder is preferably selected from polyimide resins, especially aromatic polyimide resins. The aromatic polyimide resin binder has good solvent resistance, and may comply with a volume expansion associated with charge/discharge cycles to prevent peeling of the negative electrode from the current collector and separation of the active material. The resultant negative electrode has improved bond to the current collector and ensures fabrication of a non-aqueous electrolyte secondary battery which has a high initial charge/discharge efficiency, mitigated volumetric changes associated with charge/discharge cycles, improved performance and efficiency over repeated charge/discharge cycles. Note that the binder may be used alone or in admixture of two or more.

The aromatic polyimide resins are generally difficulty soluble in organic solvents and must not be swollen or dissolved in electrolytic solution. In general, aromatic polyimide resins are soluble only in high-boiling organic solvents, for example, cresol. Thus an electrode paste may be prepared by adding a polyamic acid, polyimide precursor which is relatively easily soluble in many organic solvents such as dimethylformamide, dimethylacetamide, N-methylpyrrolidone, ethyl acetate, acetone, methyl ethyl ketone, methyl isobutyl ketone, and dioxolan, and heat treating at a temperature of at least 300° C. for a long time for thereby effecting dehydration and imidization, thus forming a polyimide binder.

Suitable aromatic polyimide resins are those having a basic skeleton derived from tetracarboxylic dianhydrides and diamines. Suitable tetracarboxylic dianhydrides include aromatic tetracarboxylic dianhydrides such as pyromellitic dianhydride, benzophenonetetracarboxylic dianhydride and biphenyltetracarboxylic dianhydride, alicyclic tetracarboxylic dianhydrides such as cyclobutanetetracarboxylic dianhydride, cyclopentanetetracarboxylic dianhydride and cyclohexanetetracarboxylic dianhydride, and aliphatic tetracarboxylic dianhydrides such as butanetetracarboxylic dianhydride, alone or in admixture.

Suitable diamines include aromatic, alicyclic and aliphatic diamines such as, for example, p-phenylene diamine, m-phenylene diamine, 4,4'-diaminodiphenylmethane, 4,4'-diaminodiphenyl ether, 2,2'-diaminodiphenylpropane, 4,4'-diaminodiphenyl sulfone, 4,4'-diaminobenzophenone, 2,3-diaminonaphthalene, 1,3-bis(4-aminophenoxy)benzene, 1,4-bis(4-aminophenoxy)benzene, 4,4'-di(4-aminophenoxy) diphenyl sulfone, 2,2'-bis[4-(4-aminophenoxy)phenyl] propane,
alone or in admixture.

Synthesis of polyamic acid intermediate is generally carried out by a solution polymerization process. The process uses a solvent such as N,N'-dimethylformamide, N,N'-dimethylacetamide, N-methyl-2-pyrrolidone, N-methylcaprolactam, dimethyl sulfoxide, tetramethyl urea, pyridine, dimethyl sulfone, hexamethylphosphoramide, and butyrolactone, alone or in admixture.

The reaction temperature is generally in the range of −20° C. to 150° C., and preferably −5° C. to 100° C. The polyamic acid intermediate is converted into a polyimide resin typically by heating to induce dehydration and cyclization. Heating for dehydration and cyclization may be at any temperature in the range of 140 to 400° C. and preferably 150 to 250° C. The time taken for dehydration and cyclization is 30 seconds to 10 hours, and preferably 5 minutes to 5 hours, depending on the heating temperature.

As the polyimide resin, polyimide resins in powder form and solutions of polyimide precursors in N-methylpyrrolidone are commercially available. Examples include U-Varnish A, U-Varnish S, UIP-R and UIP-S from Ube Industries Ltd., Kayaflex KPI-121 from Nippon Kayaku Co., Ltd., and Rikacoat SN-20, PN-20 and EN-20 from New Japan Chemical Co., Ltd.

The binder is present in an amount of 1 to 20%, and preferably 3 to 15% by weight based on the negative electrode material. Less amounts of the binder may allow the active material to separate apart whereas excessive amounts may reduce the percent voids and increase a dielectric fraction to interfere with migration of lithium ions.

Negative Electrode Material

When a negative electrode material is prepared using the active material, a conductive agent such as graphite may be added. The type of conductive agent used herein is not particularly limited as long as it is an electronically conductive material which does not undergo decomposition or alteration in the battery. Illustrative conductive agents include metals in powder or fiber form such as Al, Ti, Fe, Ni, Cu, Zn, Ag, Sn and Si, natural graphite, synthetic graphite, various coke powders, meso-phase carbon, vapor phase grown carbon fibers, pitch base carbon fibers, PAN base carbon fibers, and graphite obtained by firing various resins. The conductive agent is preferably used in solvent dispersion form because an electrode paste in which the conductive agent is uniformly distributed and bonded to silicon and silicon oxide particles is obtained by previously dispersing the conductive agent in a solvent such as water or N-methyl-2-pyrrolidone and adding the dispersion to the active material. Any well-known surfactant may be added to help disperse the conductive agent in the solvent. The solvent used for conductive agent dispersion is desirably the same as the solvent used for the binder.

The conductive agent is present in an amount of up to 50% by weight based on the negative electrode material (corresponding to a battery capacity of at least about 1,000 mAh/g of the negative electrode material). The amount of conductive agent is preferably 1 to 30%, and more preferably 1 to 10% by weight based on the negative electrode material. If the amount of the conductive agent is too small, the negative electrode material may have a poor conductivity, tending to exhibit a higher initial resistivity. An excessive amount of the conductive agent may lead to a loss of battery capacity.

Besides the polyimide resin binder, carboxymethyl cellulose, sodium polyacrylate, acrylic polymers or fatty acid esters may be added as a viscosity regulator to the negative electrode material.

The negative electrode material is prepared by combining silicon oxide particles and silicon particles with the binder. In one procedure, a mixture of coated silicon oxide particles and silicon particles is previously dispersed in a solvent such as water or N-methyl-2-pyrrolidone before the binder is compounded therein. Where the negative electrode material contains an active material consisting of coated silicon oxide particles and silicon particles and 1 to 20% by weight of the binder, it is recommended that neat silicon oxide particles and coated silicon oxide particles be kept in an atmosphere at a temperature of up to 1,100° C., more preferably up to 1,050° C. throughout the process from the start with neat silicon oxide particles until the completion of negative electrode material.

Negative Electrode

From the negative electrode material, a negative electrode may be prepared, for example, by the following procedure. The negative electrode (shaped form) is prepared by combining the active material, binder, conductive agent, and additives, kneading them in a solvent suitable for dissolution and dispersion of the binder such as water or N-methylpyrrolidone to form a paste-like mix, and applying the mix in sheet form to a current collector. The current collector used herein may be a foil of any material which is commonly used as the negative electrode current collector, for example, a copper or nickel foil while the thickness and surface treatment thereof are not particularly limited. The method of shaping or molding the mix into a sheet is not limited, and any well-known method may be used.

Preferably the negative electrode material experiences a volumetric change by a factor of not more than 2 before and after charging, more preferably a volumetric change by a factor of less than 2, even more preferably 1.0 to 1.8, and most preferably 1.0 to 1.6. A negative electrode material experiencing such a small volumetric change before and after charging is provided by the negative electrode material of the invention. More specifically, provided that the negative electrode material has a volume V1 prior to charging and a volume V2 after charging, V2 is greater than V1 by a factor of not more than 2 (i.e., V2/V1≦2), preferably less than 2. Note that a volumetric change before and after charging is measured according to the procedure "Determination of Battery Properties" in Example to be described later.

Non-Aqueous Electrolyte Secondary Battery

A non-aqueous electrolyte secondary battery may be fabricated from the negative electrode (shaped form) thus obtained. A typical secondary battery is a lithium ion secondary battery. A further embodiment of the present invention is a secondary battery comprising a positive electrode, a negative electrode, a separator, and a non-aqueous electrolyte, characterized in that the negative electrode comprises the negative electrode material defined herein, that is, the negative electrode (shaped form) constructed as above. The other components including positive electrode, separator, electrolytic solution and electrolyte, and the battery shape are not particularly limited.

The positive electrode active materials include oxides and sulfides which are capable of occluding and releasing lithium ions. They may be used alone or in admixture. Examples include sulfides and oxides of metals excluding lithium such as $TiS_2$, $MOS_2$, $NbS_2$, $ZrS_2$, $VS_2$, $V_2O_5$, $MoO_3$, $Mg(V_3O_8)_2$, and lithium and lithium-containing complex oxides. Composite metals such as $NbSe_2$ are also useful. For increasing the energy density, lithium complex oxides based on $Li_pMetO_2$ are preferred wherein Met is preferably at least one element of cobalt, nickel, iron and manganese and p has a value in the range: $0.05 \leq p \leq 1.10$. Illustrative examples of the lithium complex oxides include $LiCoO_2$, $LiNiO_2$, $LiFeO_2$, and $Li_q$-$Ni_rCo_{1-r}O_2$ (wherein q and r have values varying with the charged/discharged state of the battery and usually in the range: $0<q<1$ and $0.7<r\leq 1$) having a layer structure, $LiMn_2O_4$ having a spinel structure, and rhombic $LiMnO_2$. Also used is a substitutional spinel type manganese compound adapted for high voltage operation which is $LiMet_sMn_{1-s}O_4$ wherein Met is titanium, chromium, iron, cobalt, nickel, copper, zinc or the like and s has a value in the range: $0<s<1$.

It is noted that the lithium complex oxide described above is prepared, for example, by grinding and mixing a carbonate, nitrate, oxide or hydroxide of lithium and a carbonate, nitrate, oxide or hydroxide of a transition metal in accordance with the desired composition, and firing at a temperature in the range of 600 to 1,000° C. in an oxygen atmosphere.

Organic materials may also be used as the positive electrode active material. Examples include polyacetylene, polypyrrole, poly-p-phenylene, polyaniline, polythiophene, polyacene, and polysulfide.

From the positive electrode active material, a positive electrode (shaped form) may be prepared by a well-known method, specifically by mixing the active material with a conductive agent and a binder (as used in the negative electrode mix) and applying the mix to a current collector.

The separator disposed between the positive and negative electrodes is not particularly limited as long as it is stable to the electrolytic solution and holds the solution effectively. The separator is most often a porous sheet or non-woven fabric of polyolefins such as polyethylene, polypropylene and copolymers thereof and aramide resins. Such sheets may be used as a single layer or a laminate of multiple layers. Ceramics such as metal oxides may be deposited on the surface of sheets. Porous glass and ceramics are employed as well.

The non-aqueous solvent used herein is not particularly limited as long as it can serve for the non-aqueous electrolytic solution. Suitable solvents include aprotic high-dielectric-constant solvents such as ethylene carbonate, propylene carbonate, butylene carbonate, and γ-butyrolactone; and aprotic low-viscosity solvents such as dimethyl carbonate, ethyl methyl carbonate, diethyl carbonate, methyl propyl carbonate, dipropyl carbonate, diethyl ether, tetrahydrofuran, 1,2-dimethoxyethane, 1,2-diethoxyethane, 1,3-dioxolan, sulfolane, methylsulfolane, acetonitrile, propionitrile, anisole, acetic acid esters, e.g., methyl acetate and propionic acid esters. It is desirable to use a mixture of an aprotic high-dielectric-constant solvent and an aprotic low-viscosity solvent in a proper ratio. It is also acceptable to use ionic liquids containing imidazolium, ammonium and pyridinium cations. The counter anions are not particularly limited and include $BF_4^-$, $PF_6^-$ and $(CF_3SO_2)_2N^-$. The ionic liquid may be used in admixture with the foregoing non-aqueous solvent.

Where a solid electrolyte or gel electrolyte is desired, a silicone gel, silicone polyether gel, acrylic gel, acrylonitrile gel, poly(vinylidene fluoride) or the like may be included in a polymer form. These ingredients may be polymerized prior to or after casting. They may be used alone or in admixture.

Exemplary of the electrolyte salt used herein are light metal salts. Examples of the light metal salts include salts of alkali metals such as lithium, sodium and potassium, salts of alkaline earth metals such as magnesium and calcium, and aluminum salts. A choice may be made among these salts and mixtures thereof depending on a particular purpose. Examples of suitable lithium salts include $LiBF_4$, $LiClO_4$, $LiPF_6$, $LiAsF_6$, $CF_3SO_3Li$, $(CF_3SO_2)_2NLi$, $C_4F_9SO_3Li$, $CF_3CO_2Li$, $(CF_3CO_2)_2NLi$, $C_6F_5SO_3Li$, $C_4F_{17}SO_3Li$, $(C_2F_5SO_2)_2NLi$, $(C_4F_9SO_2)(CF_3SO_2)NLi$, $(FSO_2C_6F_4)(CF_3SO_2)NLi$, $((CF_3)_2CHOSO_2)_2NLi$, $(CF_3SO_2)_3CLi$, $(3,5-(CF_3)_2C_6F_3)_4BLi$, $LiCF_3$, $LiAlCl_4$, and $C_4BO_8Li$, which may be used alone or in admixture.

From the electric conductivity aspect, the electrolyte salt is preferably present in a concentration of 0.5 to 2.0 mole/liter of the non-aqueous electrolytic solution. The electrolyte should preferably have a conductivity of at least 0.01 S/cm at a temperature of 25° C., which may be adjusted in terms of the type and concentration of the electrolyte salt.

If desired, various additives may be added to the non-aqueous electrolytic solution. Examples include an additive for improving cycle life such as vinylene carbonate, methyl vinylene carbonate, ethyl vinylene carbonate and 4-vinylethylene carbonate, an additive for preventing over-charging such as biphenyl, alkylbiphenyl, cyclohexylbenzene, t-butylbenzene, diphenyl ether, and benzofuran, and various carbonate compounds, carboxylic acid anhydrides, nitrogen- and sulfur-containing compounds for acid removal and water removal purposes.

The secondary battery may take any desired shape. In general, the battery is of the coin type wherein electrodes and a separator, all punched into coin shape, are stacked, or of the rectangular or cylinder type wherein electrode sheets and a separator are spirally wound.

EXAMPLE

Examples are given below for further illustrating the invention, but they are not to be construed as limiting the invention thereto. In Examples, all percents (%) are by weight, and the particle size is a median diameter $D_{50}$ as determined by a particle size distribution instrument utilizing laser light diffractometry. In Tables, silicon oxide, polycrystalline silicon, and silicon particles are abbreviated as SiO, p-Si, and Si particles, respectively. A jet mill AFG-100 is available from Hosokawa Micron Group, and a classifier TC-15 is available from Nisshin Engineering Co., Ltd.

Preparation of Silicon Oxide Particles I-1

A mixture of equimolar amounts of silicon dioxide particles (BET specific surface area=200 m²/g) and chemical grade metallic silicon particles (BET specific surface area=4 m²/g) was heat treated in a hot vacuum atmosphere at 1,350° C. and 0.1 Torr to produce silicon oxide gas, which precipitated on a stainless steel substrate held at 1,000° C. The precipitate was recovered and crushed by a jaw crusher. The crushed material was ground in a jet mill AFG-100 with the built-in classifier operating at 9,000 rpm. From a downstream cyclone, a fraction of silicon oxide particles (SiOx: x=1.02) having $D_{50}=7.6$ μm and $D_{90}=11.9$ μm was recovered.

Preparation of Silicon Oxide Particles I-2

A rotary kiln type reactor was charged with the silicon oxide particles I-1 obtained above, where hot CVD was performed in a stream of a methane-argon gas mixture at a temperature of 1,000° C. and an average residence time of about 2 hours. At the end of operation, the reactor was cooled, and black particles were recovered. The black particles had carbon deposited thereon in an amount of 5.1 wt % based on the carbon-coated silicon oxide.

Preparation of Polycrystalline Silicon Particles I-1 to I-4

Figure 2:
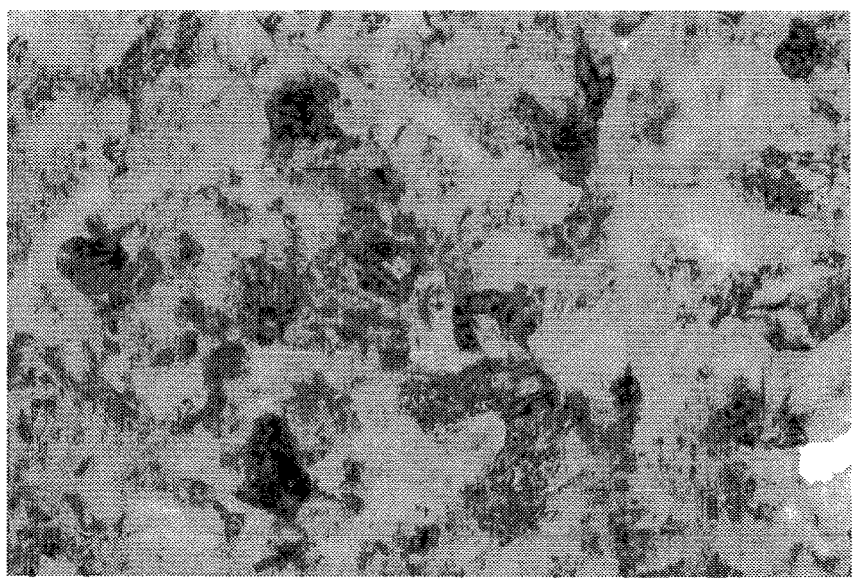
FIG. 2 is a TEM image (×60,000) showing the crystal structure of polycrystalline silicon I-1 according to the invention.

By introducing polycrystalline silicon fines into a fluidized bed at an internal temperature of 800° C. and feeding monosilane thereto, particulate polycrystalline silicon was prepared. It was ground in a jet mill AFG-100 with the built-in classifier operating at 7,200 rpm and then classified through a classifier TC-15. There were obtained fractions of polycrystalline silicon particles having $D_{50}=0.5$ μm, 6.1 μm, 11.0 μm, and 15.7 μm. FIG. 1 is a TEM image in section of a particle. FIG. 2 is an enlarged TEM image of crystal grains.

Preparation of Polycrystalline Silicon Particles I-5

Figure 3:
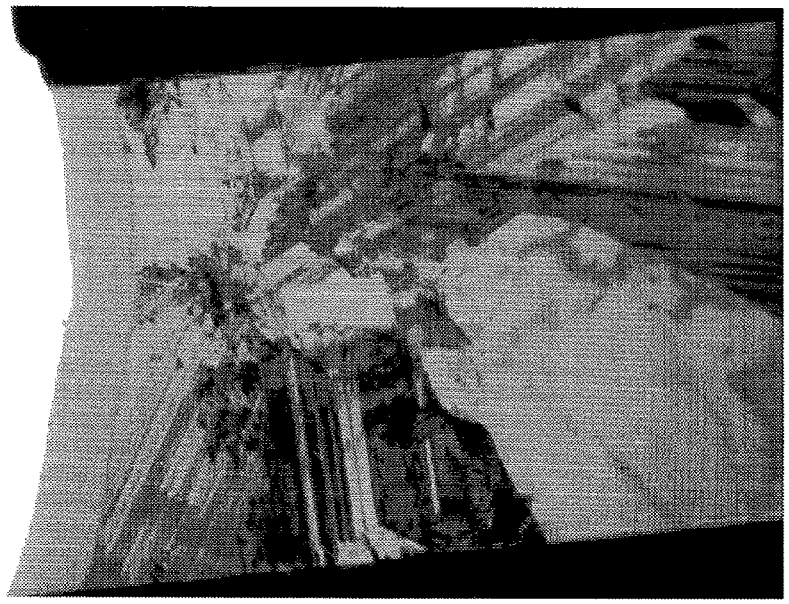
FIG. 3 is a TEM image (×12,000) showing the crystal structure of polycrystalline silicon I-5 according to the invention.

By introducing polycrystalline silicon chips heated at 800° C. into a bell jar at an internal temperature of 400° C. and feeding monosilane thereto, columnar polycrystalline silicon was prepared. It was crushed by a jaw crusher, ground in a jet mill AFG-100 with the built-in classifier operating at 7,200 rpm and then classified through a classifier TC-15. A rotary kiln type reactor was charged with the silicon particles thus obtained, where hot CVD was performed in a stream of a methane-argon gas mixture at a temperature of 1,000° C. and an average residence time of about 2 hours. At the end of operation, the reactor was cooled, and black particles were recovered. The black particles had carbon deposited thereon in an amount of 2.2 wt % based on the carbon-coated polycrystalline silicon. The particles were disintegrated, obtaining a fraction of polycrystalline silicon particles having $D_{50}=9.5$ μm. FIG. 3 is a TEM image in section of a particle.

Preparation of Polycrystalline Silicon Particles I-6

Figure 4:
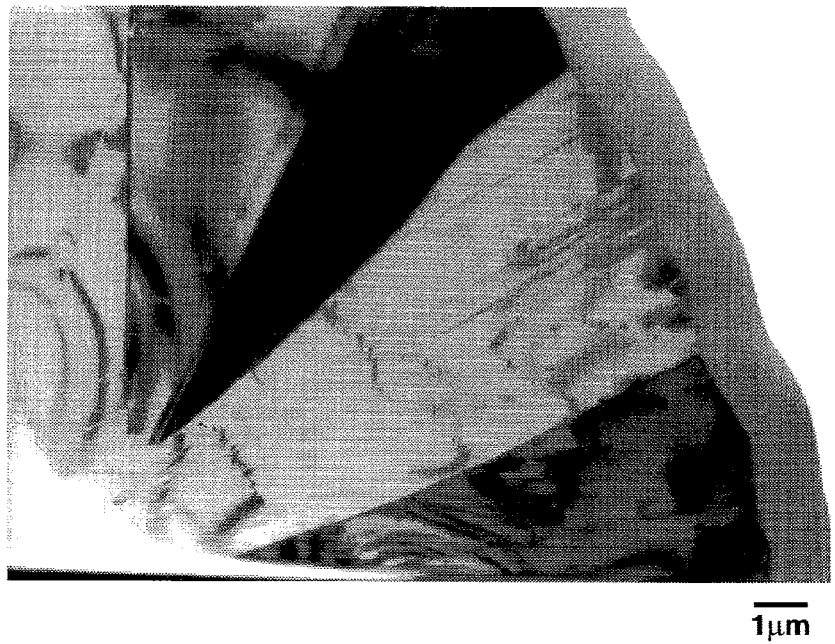
FIG. 4 is a TEM image (×12,000) showing the crystal structure of polycrystalline silicon I-6 according to the invention.

By introducing polycrystalline silicon chips heated at 1,100° C. into a bell jar at an internal temperature of 400° C. and feeding trichlorosilane thereto, a polycrystalline silicon mass was prepared. It was crushed by a jaw crusher, ground in a jet mill AFG-100 with the built-in classifier operating at 7,200 rpm, further ground in a bead mill for 4 hours, and classified through a classifier TC-15. There was obtained a fraction of polycrystalline silicon particles having $D_{50}=9.1$ μm. FIG. 4 is a TEM image in section of a particle.

Preparation of Silicon Particles I-1

A metallic silicon mass (available from Elkem) was ground in a jet mill AFG-100 with the built-in classifier operating at 7,200 rpm, and classified through a classifier TC-15. There was obtained a fraction of metallic silicon particles having $D_{50}=9.2$ μm.

The polycrystalline silicon particles thus obtained were measured for crystallite size, true specific gravity and particle size, with the results shown in Table 1. Note that the true specific gravity of polycrystalline silicon was determined by a gas adsorption method (pycnometer) using helium gas.

TABLE 1

| | Crystallite size, nm | True specific gravity | $D_{50}$, μm |
|---|---|---|---|
| p-Si particle I-1 | 24 | 2.308 | 0.5 |
| p-Si particle I-2 | 25 | 2.309 | 6.1 |
| p-Si particle I-3 | 25 | 2.308 | 11.0 |
| p-Si particle I-4 | 25 | 2.308 | 15.7 |
| p-Si particle I-5 | 30 | 2.320 | 9.5 |
| p-Si particle I-6 | 35 | 2.326 | 9.1 |
| Si particle I-1 | 43 | 2.335 | 9.2 |

Determination of Battery Properties

To confirm the effectiveness of the silicon oxide particles/silicon particles negative electrode material, the charge/discharge capacity and volume expansion of the material were measured. A mixture of silicon oxide particles, silicon particles and a dispersion of acetylene black as a conductive agent in N-methylpyrrolidone (solids 17.5%) was diluted with N-methylpyrrolidone. A polyimide resin (solids 18.1%) as a binder was added thereto to form a slurry. The slurry was coated onto a copper foil of 12 μm thick by means of a doctor blade having a gap of 50 μm, vacuum dried at 200° C. for 2 hours, and pressed by a roller press at 60° C. into a negative electrode shaped form. Finally, pieces of 2 cm² were punched out of the shaped form and used as a negative electrode. The composition of solid components is shown in Table 2.

To evaluate the negative electrode material, six lithium ion secondary cells were fabricated using the shaped form as the negative electrode and a lithium foil as the counter electrode. The electrolytic solution was a non-aqueous electrolyte solution of lithium bis(trifluoromethanesulfonyl)imide in a 1/1 (by volume) mixture of ethylene carbonate and diethyl carbonate in a concentration of 1 mol/liter. The separator was a porous polyethylene film of 30 μm thick.

The test cells were aged overnight at room temperature. Two of the test cells were disassembled immediately after aging, and thickness measurement was performed, that is, the thickness in the state swollen with electrolytic solution was measured. Note that an increment of lithium resulting from the electrolytic solution and charging was neglected. Next two of the test cells were tested by means of a secondary cell charge/discharge tester (Nagano K.K.). Charging was conducted with a constant current flow of 0.05 c until the voltage of the test cell reached 5 mV, and after reaching 5 mV, continued with a reduced current flow so that the cell voltage was kept at 5 mV, and terminated when the current flow decreased below 0.02 c. Note that "c" designates a current value with which the theoretical capacity of a negative electrode is charged in 1 hour, i.e., 1 c=15 mA. At the end of the charging test, the test cells were disassembled, and thickness measurement was performed. A percent volume expansion upon charging was calculated. For the remaining two test cells, the same charging test was carried out, after which the cell was discharged with a constant current flow of 0.05 c until the cell voltage reached 1,500 mV. A charge/discharge capacity was determined, from which a 1st cycle charge/discharge efficiency was computed. The charge/discharge capacity is a capacity per active material excluding the binder. The 1st cycle charge/discharge efficiency is a percentage of discharge capacity relative to charge capacity.

The composition of the negative electrode is shown in Table 2 together with the test results.

TABLE 2

|  | Example | | | | | | | | | Comparative Example |
| --- | --- | --- | --- | --- | --- | --- | --- | --- | --- | --- |
|  | 1 | 2 | 3 | 4 | 5 | 6 | 7 | 8 | 9 | 1 |
| SiO particle I-1 (wt %) | 75 | | | | | | | | | |
| SiO particle I-2 (wt %) | | 80 | 80 | 80 | 80 | 70 | 60 | 80 | 80 | 90 |
| p-Si particle I-1 (wt %) | 10 | 10 | | | | 20 | 30 | | | |
| p-Si particle I-2 (wt %) | | | 10 | | | | | | | |
| p-Si particle I-3 (wt %) | | | | 10 | | | | | | |
| p-Si particle I-4 (wt %) | | | | | 10 | | | | | |
| p-Si particle I-5 (wt %) | | | | | | | | 10 | | |
| p-Si particle I-6 (wt %) | | | | | | | | | 10 | |
| Acetylene black (wt %) | 5 | | | | | | | | | |
| Polyimide resin (wt %) | 10 | 10 | 10 | 10 | 10 | 10 | 10 | 10 | 10 | 10 |
| Volumetric change factor | 1.61 | 1.50 | 1.53 | 1.62 | 1.63 | 1.49 | 1.50 | 1.72 | 1.86 | 1.44 |
| Charge capacity (mAh/g) | 2105 | 2272 | 2240 | 2301 | 2320 | 2461 | 2702 | 2220 | 2238 | 2076 |
| Discharge capacity (mAh/g) | 1585 | 1729 | 1712 | 1736 | 1759 | 1932 | 2201 | 1693 | 1699 | 1505 |
| 1st cycle charge/discharge efficiency (%) | 75.3 | 76.1 | 76.4 | 75.4 | 75.8 | 78.5 | 81.5 | 76.3 | 75.9 | 72.5 |

Examples 1 to 9 within the scope of the invention demonstrate a high 1st cycle charge/discharge efficiency and an increased battery capacity as compared with Comparative Example 1. The use of the negative electrode material of the invention achieves improvements in 1st cycle charge/discharge efficiency and volume expansion retention which are to be overcome prior to practical use.

Determination of Cycle Performance

The effectiveness of negative electrode active material in a lithium ion secondary battery was evaluated by comparing Example 4 with Comparative Example 1. In these examples, the negative electrode shaped forms were prepared by the same procedure as described above.

To evaluate the cycle performance of the negative electrode shaped forms, a coin-type lithium ion secondary cell was fabricated. The positive electrode was a single layer sheet using LiCoO$_2$ as the active material and an aluminum foil as the current collector (trade name Pioxcel C-100 by Pionics Co., Ltd.). The non-aqueous electrolyte was a non-aqueous electrolyte solution of lithium hexafluorophosphate in a 1/1 (by volume) mixture of ethylene carbonate and diethyl carbonate in a concentration of 1 mol/liter. The separator was a porous polyethylene film of 30 μm thick.

The cell was aged two nights at room temperature before it was tested by means of a secondary cell charge/discharge tester (Nagano K.K.). Charging was conducted with a constant current flow of 1.2 mA (0.25 c vs. positive electrode) until the voltage of the test cell reached 4.2 V, and after reaching 4.2 V, continued with a reduced current flow so that the cell voltage was kept at 4.2 V, and terminated when the current flow decreased below 0.3 mA. Discharging was conducted with a constant current flow of 0.6 mA and terminated when the cell voltage reached 2.5 V. A discharge capacity was determined. The charging/discharging operation was repeated 50 cycles. The discharge capacity at the 50th cycle divided by the discharge capacity at the 10th cycle is reported as a percent discharge capacity retentivity in Table 3. Example 4 displayed substantially equivalent cycle performance to that prior to addition of silicon particles, despite increases of initial efficiency and battery capacity as compared with Comparative Example 1.

TABLE 3

|  | Discharge capacity retentivity after 50 cycles, % |
| --- | --- |
| Example 4 | 83.9 |
| Comparative Example 1 | 81.2 |

Preparation of Coated Silicon Oxide Particles II-1

A mixture of equimolar amounts of silicon dioxide particles (BET specific surface area=200 m$^2$/g) and chemical grade metallic silicon particles (BET specific surface area=4 m$^2$/g) was heat treated in a hot vacuum atmosphere at 1,350° C. and 10 Pa to produce silicon oxide gas, which precipitated on a stainless steel substrate held at 800° C. The precipitate was recovered and crushed by a jaw crusher. The crushed material was ground in a jet mill AFG-100 with the built-in classifier operating at 9,000 rpm. From a downstream cyclone, a fraction of silicon oxide particles (SiOx: x=1.02) having D$_{50}$=7.6 μm and D$_{90}$=11.9 μm was recovered. When a sample of this powder was analyzed by solid NMR ($^{29}$Si-DDMAS), it exhibited a signal area S$_{-84}$ of diamond structure silicon around −84 ppm and a broad signal area S$_{-110}$ of silicon dioxide centering around −110 ppm in an area ratio S$_{-84}$/S$_{-110}$=0.69.

A lateral heating furnace was charged with the silicon oxide particles obtained above, evacuated by an oil rotary vacuum pump, and fed with CH$_4$ gas at 0.5 NL/min. Treatment under conditions of 1,000° C. and 2,000 Pa continued for 5 hours whereby the particles were coated with graphite. At the end of operation, the furnace was cooled, and black particles were recovered.

Figure 5:
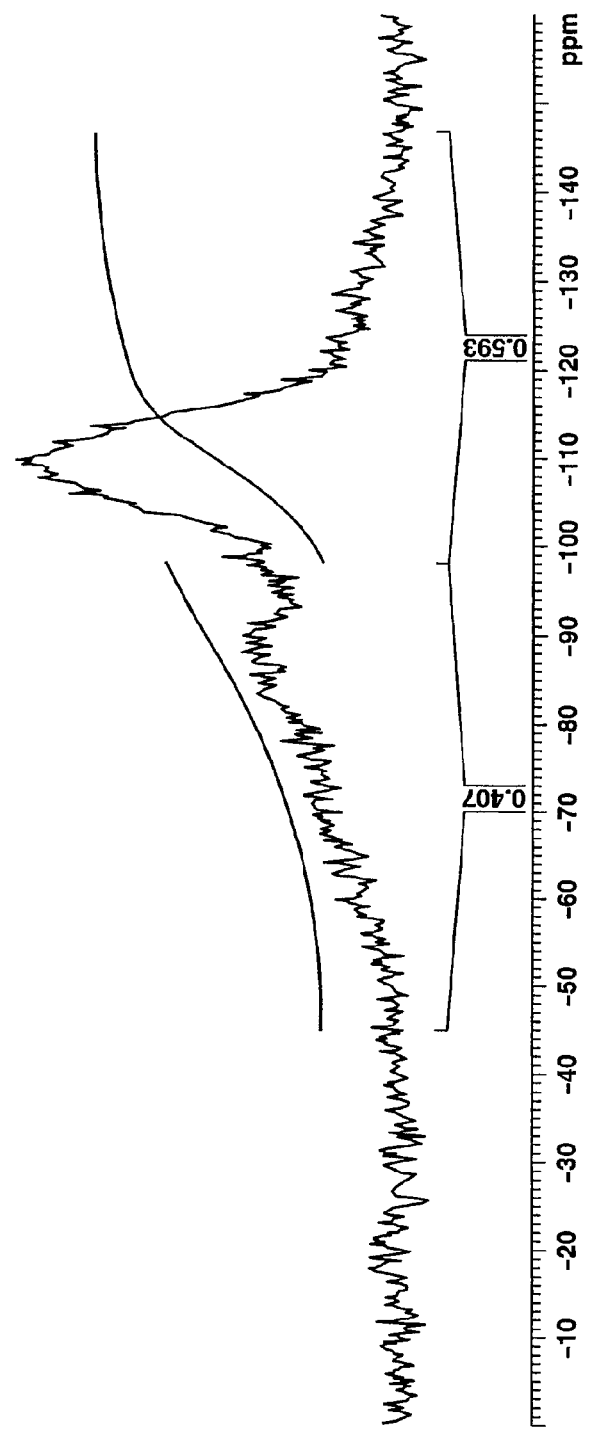
FIG. 5 is a solid NMR ($^{29}$Si-DDMAS) spectrum of coated silicon oxide particles II-1.
Figure 8:
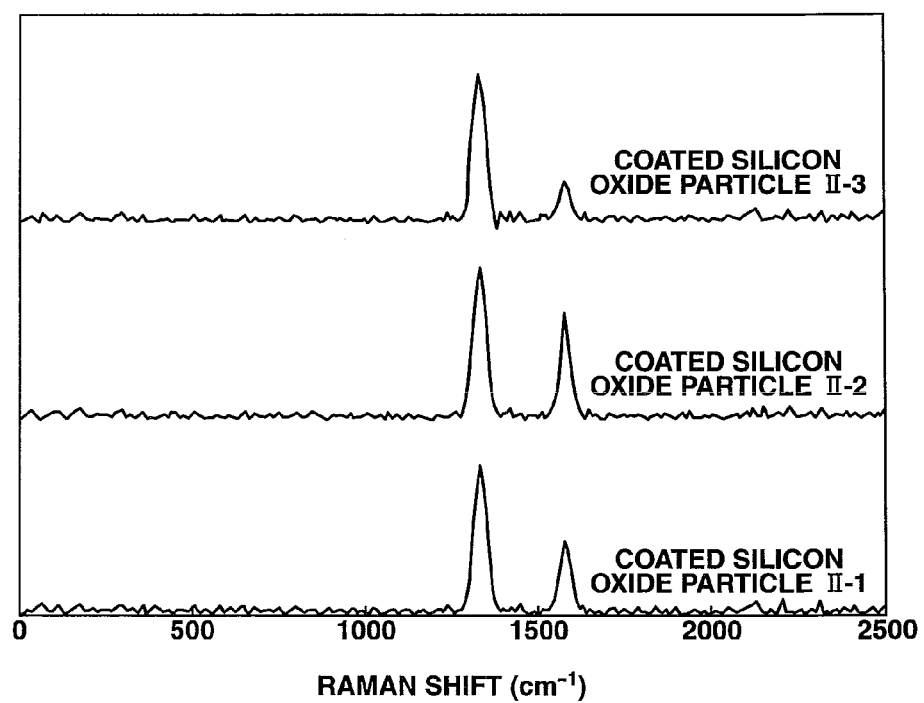
FIG. 8 shows Raman spectra of coated silicon oxide particles II-1, 2 and 3.

The black particles were conductive particles having an average particle size of 8.2 μm and a carbon buildup of 5% (based on the black particles). When a sample of this black powder was analyzed by solid NMR ($^{29}$Si-DDMAS), it exhibited a signal area S$_{-84}$ of diamond structure silicon around −84 ppm and a broad signal area S$_{-110}$ of silicon dioxide centering around −110 ppm in an area ratio S$_{-84}$/S$_{-110}$=0.69 (see FIG. 5). On Raman spectroscopy analysis, the Raman shift displayed peaks at 1330 cm$^{-1}$ and 1580 cm$^{-1}$ in an intensity ratio I$_{1330}$/I$_{1580}$=2.0 (see FIG. 8).

Preparation of Coated Silicon Oxide Particles II-2

Black particles were prepared by the same procedure as above (II-1), without operating the oil rotary vacuum pump. That is, the silicon oxide particles were treated under atmospheric pressure at 1,150° C. while feeding a mixture of Ar and CH$_4$ at 2.0 and 0.5 NL/min whereby the particles were coated with graphite.

Figure 6:
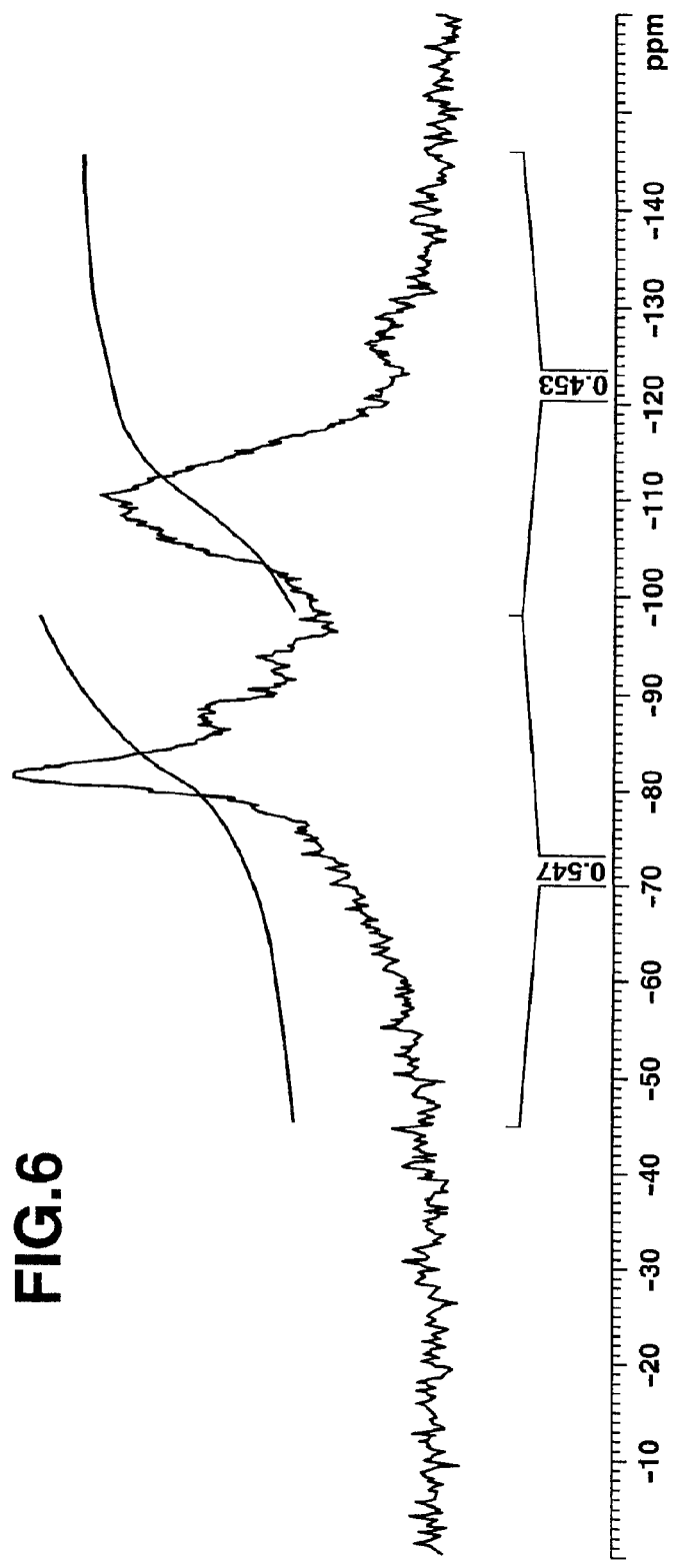
FIG. 6 is a solid NMR ($^{29}$Si-DDMAS) spectrum of coated silicon oxide particles II-2.

The black particles thus recovered were conductive particles having an average particle size of 8.5 μm and a carbon buildup of 5% (based on the black particles). When a sample of this black powder was analyzed by solid NMR ($^{29}$Si-DDMAS), it exhibited a signal area S$_{-84}$ of diamond structure silicon around −84 ppm and a broad signal area $S_{-110}$ of silicon dioxide centering around −110 ppm in an area ratio $S_{-84}/S_{-110}=1.21$ (see FIG. 6). On Raman spectroscopy analysis, the Raman shift displayed peaks at 1330 cm$^{-1}$ and 1580 cm$^{-1}$ in an intensity ratio $I_{1330}/I_{1580}=1.4$ (see FIG. 8).

Preparation of Coated Silicon Oxide Particles II-3

Black particles were prepared by the same procedure as above (II-1) except that a vacuum of 30 Pa was established by operating not only the oil rotary vacuum pump, but also a mechanical booster pump. The silicon oxide particles were coated with graphite.

Figure 7:
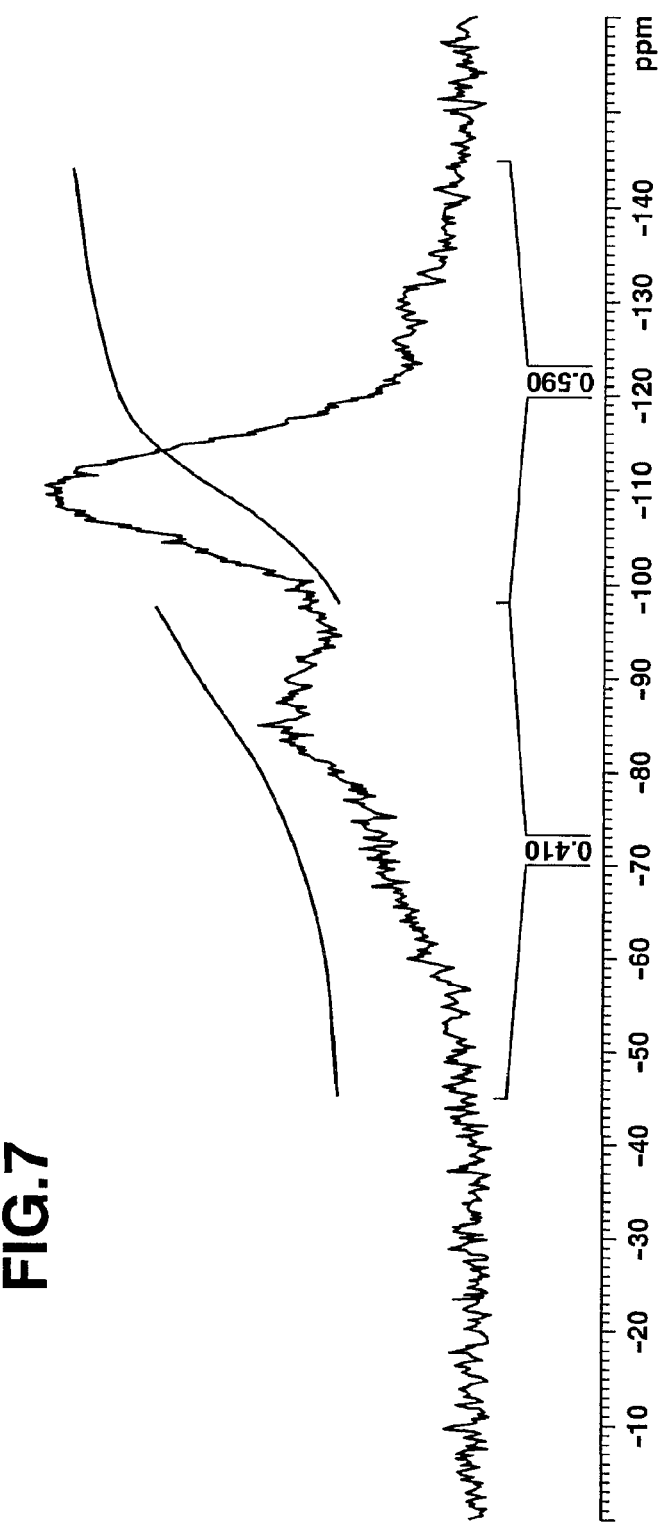
FIG. 7 is a solid NMR ($^{29}$Si-DDMAS) spectrum of coated silicon oxide particles II-3.

The black particles thus recovered were conductive particles having an average particle size of 8.5 μm and a carbon buildup of 4.5% (based on the black particles). When a sample of this black powder was analyzed by solid NMR ($^{29}$Si-DDMAS), it exhibited a signal area $S_{-84}$ of diamond structure silicon around −84 ppm and a broad signal area $S_{-110}$ of silicon dioxide centering around −110 ppm in an area ratio $S_{-84}/S_{-110}=0.69$ (see FIG. 7). On Raman spectroscopy analysis, the Raman shift displayed peaks at 1330 cm$^{-1}$ and 1580 cm$^{-1}$ in an intensity ratio $1330/I_{1580}=3.8$ (see FIG. 8).

Preparation of Silicon Particles II-1

A metallic silicon mass (available from Elkem) was ground in a jet mill AFG-100 with the built-in classifier operating at 7,200 rpm, and classified through a classifier TC-15. There was obtained a fraction of silicon particles having $D_{50}=6.1$ μm.

Preparation of Silicon Particles II-2

A polycrystalline silicon mass prepared by pyrolysis of trichlorosilane at 1,100° C. was crushed by a jaw crusher, ground in a jet mill AFG-100 with the built-in classifier operating at 7,200 rpm, and classified through a classifier TC-15. There was obtained a fraction of polycrystalline silicon particles having $D_{50}=5.5$ μm.

Preparation of Silicon Particles II-3

A lateral heating furnace was charged with the silicon particles II-2, where hot CVD was performed in a stream of methane gas at 1,100° C. and 1,000 Pa for an average residence time of about 2 hours. At the end of operation, the furnace was cooled, and black particles were recovered. The black particles were conductive particles having an average particle size of 6.3 μm and a carbon buildup of 2% (based on the black particles).

Examples 10 to 14

Reference Example 1 & Comparative Example 2

A mixture of coated silicon oxide particles and silicon particles, prepared above, was diluted with N-methylpyrrolidone. A polyimide resin (solids 18.1%) as a binder was added thereto to form a slurry. The slurry was coated onto a copper foil of 12 μm thick by means of a doctor blade having a gap of 50 μm, vacuum dried at 200° C. for 2 hours, and pressed by a roller press at 60° C. into a negative electrode shaped form. Finally, pieces of 2 cm$^2$ were punched out of the shaped form and used as a negative electrode. The composition of solid components is shown in Table 4.

Determination of Battery Properties

To confirm the effectiveness of the negative electrode material, the charge/discharge capacity and volume expansion of the material were measured as follows. Six lithium ion secondary cells were fabricated using the shaped form as the negative electrode and a lithium foil as the counter electrode. The electrolytic solution was a non-aqueous electrolyte solution of lithium bis(trifluoromethanesulfonyl)imide in a 1/1 (by volume) mixture of ethylene carbonate and diethyl carbonate in a concentration of 1 mol/liter. The separator was a porous polyethylene film of 30 μm thick.

The test cells were aged overnight at room temperature. Two of the test cells were disassembled immediately after aging, and thickness measurement was performed, that is, the thickness in the state swollen with electrolytic solution was measured, from which a volume V1 prior to charging was determined. Note that an increment of lithium resulting from the electrolytic solution and charging was neglected. Next two of the test cells were tested by means of a secondary cell charge/discharge tester (Nagano K.K.). Charging was conducted with a constant current flow of 0.05 c until the voltage of the test cell reached 5 mV, and after reaching 5 mV, continued with a reduced current flow so that the cell voltage was kept at 5 mV, and terminated when the current flow decreased below 0.02 c. Note that "c" designates a current value with which the theoretical capacity of a negative electrode is charged in 1 hour, i.e., 1 c=15 mA. At the end of the charging test, the test cells were disassembled, and thickness measurement was performed, from which a volume V2 after charging was determined. A factor of volumetric change after charging was calculated as V2/V1. For the remaining two test cells, the same charging test was carried out, after which the cell was discharged with a constant current flow of 0.05 c until the cell voltage reached 1,500 mV. A charge/discharge capacity was determined, from which a 1st cycle charge/discharge efficiency (%) was computed. The charge/discharge capacity is a capacity per active material excluding the binder. The 1st cycle charge/discharge efficiency is a percentage of discharge capacity relative to charge capacity (discharge capacity/charge capacity×100). The results are shown in Table 4.

TABLE 4

| | Composition | Example 10 | Example 11 | Example 12 | Example 13 | Example 14 | Reference Example 1 | Comparative Example 2 |
|---|---|---|---|---|---|---|---|---|
| Active material | Coated SiO particle II-1 | 80 | 70 | 60 | 80 | 80 | | 90 |
| | Coated SiO particle II-2 | | | | | | 80 | |
| | Coated SiO particle II-3 | | | | | | | |
| | Si particle II-1 | 10 | 20 | 30 | | | 10 | |
| | Si particle II-2 | | | | 10 | | | |
| | Si particle II-3 | | | | | 10 | | |
| Si particle in active material (%) | | 11 | 22 | 33 | 11 | 11 | 11 | 0 |
| Polyimide resin* | | 10 | 10 | 10 | 10 | 10 | 10 | 10 |
| Total | | 100 | 100 | 100 | 100 | 100 | 100 | 100 |
| Volumetric change factor (V2/V1) | | 1.58 | 1.61 | 1.66 | 1.56 | 1.55 | 2.02 | 1.46 |
| Charge capacity (mAh/g) | | 2191 | 2400 | 2609 | 2244 | 2210 | 2194 | 2023 |
| Discharge capacity (mAh/g) | | 1662 | 1897 | 2094 | 1717 | 1691 | 1663 | 1466 |

TABLE 4-continued

| | Example | | | | | Reference Example | Comparative Example |
| --- | --- | --- | --- | --- | --- | --- | --- |
| Composition | 10 | 11 | 12 | 13 | 14 | 1 | 2 |
| 1st cycle charge/discharge efficiency (%) | 75.9 | 79.1 | 80.3 | 76.5 | 76.5 | 75.8 | 72.5 |

*Polyimide resin: U-Varnish A by Ube Industries Ltd.

A comparison of Example 10 with Reference Example 1 reveals that the negative electrode material within the scope of the invention has a lower factor of volumetric change after charging, despite equivalent capacity and discharge efficiency. As compared with Comparative Example 2 not using silicon particles as the active material, the negative electrode materials of Examples 10 to 14 are improved in 1st cycle charge/discharge efficiency, with an increased charge/discharge capacity being observed. The factor of volumetric change remained substantially unchanged despite the increased charge/discharge capacity.

Determination of Cycle Performance

Using the negative electrode materials of Examples 10, Reference Example 1 and Comparative Example 2, the negative electrode shaped forms were prepared by the same procedure as described above. To evaluate the cycle performance of the negative electrode shaped forms, a coin-type lithium ion secondary cell was fabricated. The positive electrode was a single layer sheet using $LiCoO_2$ as the active material and an aluminum foil as the current collector (trade name Pioxcel C-100 by Pionics Co. Ltd.). The non-aqueous electrolyte was a non-aqueous electrolyte solution of lithium hexafluorophosphate in a 1/1 (by volume) mixture of ethylene carbonate and diethyl carbonate in a concentration of 1 mol/liter. The separator was a porous polyethylene film of 30 μm thick.

The cell was aged two nights at room temperature before it was tested by means of a secondary cell charge/discharge tester (Nagano K.K.). Charging was conducted with a constant current flow of 1.2 mA (0.25 c vs. positive electrode) until the voltage of the test cell reached 4.2 V, and after reaching 4.2 V, continued with a reduced current flow so that the cell voltage was kept at 4.2 V, and terminated when the current flow decreased below 0.3 mA. Discharging was conducted with a constant current flow of 0.6 mA and terminated when the cell voltage reached 2.5 V. A discharge capacity was determined. The charging/discharging operation was repeated 50 cycles. The discharge capacity at the 50th cycle divided by the discharge capacity at the 1st cycle (50th cycle discharge capacity/1st cycle discharge capacity×100) is reported as a percent discharge capacity retentivity in Table 5. Example 10 displayed substantially equivalent cycle performance to that prior to addition of silicon particles, despite increases of initial efficiency and battery capacity as compared with Comparative Example 2.

TABLE 5

| | Discharge capacity retentivity after 50 cycles, % |
| --- | --- |
| Example 10 | 84.5 |
| Reference Example 1 | 82.2 |
| Comparative Example 2 | 83.8 |

Japanese Patent Application Nos. 2008-067073 and 2008-109769 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A negative electrode material for non-aqueous electrolyte secondary batteries, comprising an active material and 1 to 20% by weight of a binder, wherein said active material comprises silicon oxide particles and silicon particles, and the silicon particles are present in an amount of not more than 50% by weight based on the active material,
   wherein the silicon oxide particles are silicon oxide particles coated on their surface with a graphite coating, and said silicon oxide particles coated on their surface with a graphite coating are present in an amount of 70 to 95% by weight based on the active material,
   said graphite coating, on Raman spectroscopy, exhibits scattering peaks having an intensity $I_{1330}$ and $I_{1580}$ at 1330 cm$^{-1}$ and 1580 cm$^{-1}$, an intensity ratio $I_{1330}/I_{1580}$ being in the range: $1.5 < I_{1330}/I_{1580} < 3.0$, and
   the coated silicon oxide particles, on solid NMR ($^{29}$Si-DDMAS) analysis, exhibit a signal area $S_{-84}$ around −84 ppm and a broad signal area $S_{-110}$ centering around −110 ppm, an area ratio $S_{-84}/S_{-110}$ being in the range: $0.5 < S_{-84}/S_{-110} < 1.1$.

2. The negative electrode material of claim 1 wherein said silicon oxide particles have been prepared by heating a mixture of silicon dioxide and metallic silicon under vacuum at a temperature of 1,000 to 1,500° C. to produce a silicon oxide gas and letting the silicon oxide gas to precipitate at a temperature of 500 to 1,100° C.

3. The negative electrode material of claim 1 wherein said silicon particles are polycrystalline silicon particles.

4. The negative electrode material of claim 3 wherein said polycrystalline silicon particles are polycrystalline silicon particles coated on their surface with a graphite coating.

5. The negative electrode material of claim 4 wherein the coating weight of graphite of said polycrystalline silicon particles coated on their surface with a graphite coating is 0.1 to 20% by weight based on the coated polycrystalline silicon particles.

6. The negative electrode material of claim 3 wherein said polycrystalline silicon particles have a crystallite size of 20 nm to 34 nm as determined, on X-ray diffraction analysis, by the Scherrer equation from the FWHM (full width at half maximum) of a diffraction curve assigned to Si(111) around 2θ=28.4°.

7. The negative electrode material of claim 3 wherein said polycrystalline silicon particles have a true specific gravity of 2.300 to 2.320.

8. The negative electrode material of claim 3 wherein said polycrystalline silicon particles have a median diameter $D_{50}$ of 0.1 to 20 μm.

9. The negative electrode material of claim 1 wherein said silicon particles are silicon particles coated on their surface with a graphite coating.

10. The negative electrode material of claim 1 wherein said binder comprises a polyimide resin.

11. The negative electrode material of claim 1 wherein the coating weight of graphite of said silicon oxide particles coated on their surface with a graphite coating is 1 to 50% by weight based on the coated silicon oxide particles.

12. A negative electrode for non-aqueous electrolyte secondary batteries, comprising the negative electrode material of claim 1 and experiencing a volumetric change by a factor of less than 2 before and after charging.

13. A non-aqueous electrolyte secondary battery comprising a negative electrode of claim 12, a positive electrode, a separator, and a non-aqueous electrolyte.

14. The non-aqueous electrolyte secondary battery of claim 13 which is a lithium ion secondary battery.

15. A method for preparing the negative electrode material of claim 1, comprising the steps of:
   (I) effecting chemical vapor deposition of an organic gas and/or vapor on silicon oxide particles under a vacuum of 50 to 30,000 Pa at 600 to 1,100° C. to coat surfaces of the silicon oxide particles with a graphite coating, and
   (II) combining the coated silicon oxide particles resulting from step (I) with silicon particles and a binder.

16. The method of claim 15 wherein throughout the steps, the silicon oxide particles and the coated silicon oxide particles are kept in an atmosphere which is up to 1,100° C.

\* \* \* \* \*